United States Patent Office 3,248,413
Patented Apr. 26, 1966

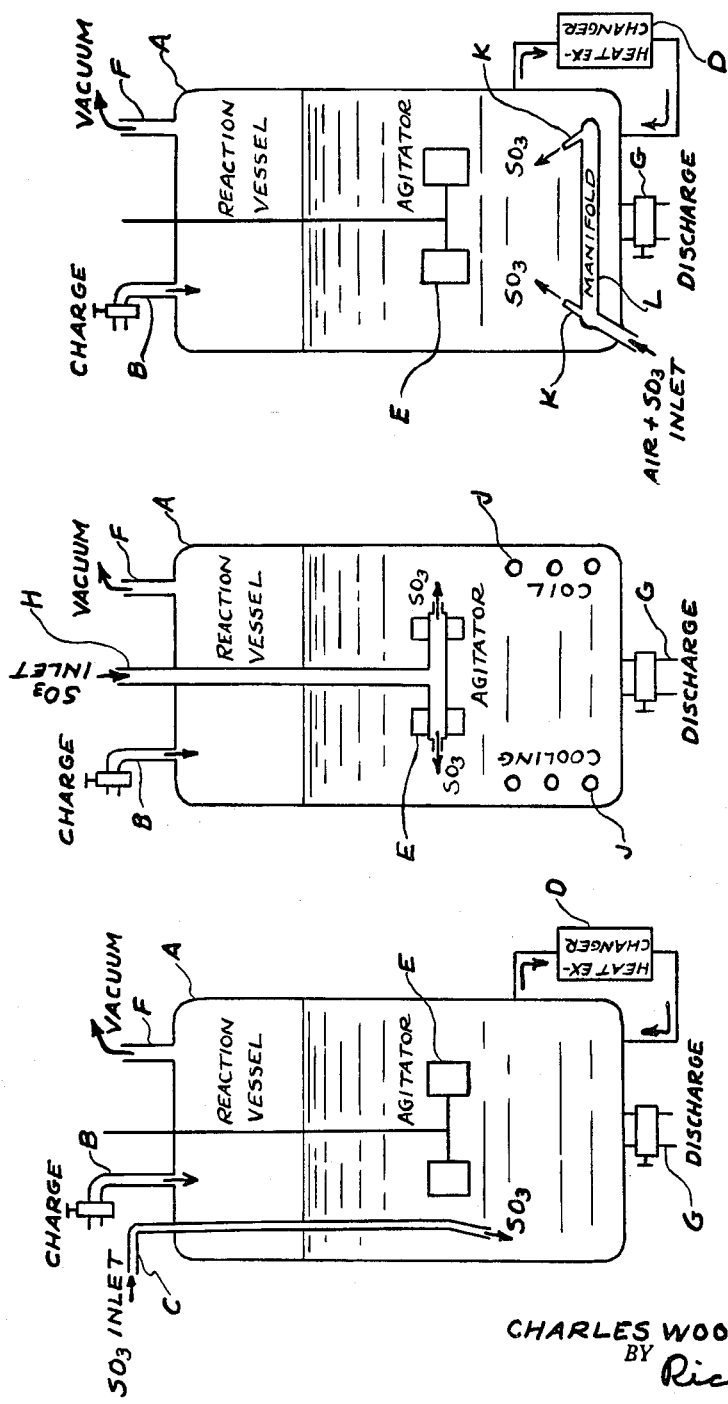

3,248,413
PROCESS OF REACTING ORGANIC COMPOUNDS WITH SULFUR TRIOXIDE
Charles Woolsey Motl, Wyoming, Ohio, assignor to The Procter & Gamble Company, Cincinnati, Ohio, a corporation of Ohio
Filed June 28, 1962, Ser. No. 206,048
6 Claims. (Cl. 260—458)

This invention relates to a process for reacting sulfur trioxide with organic compounds. In particular this invention deals with a process wherein the reaction between vaporous sulfur trioxide and a liquid organic sulfonatable compound is conducted in a reaction vessel under subatmospheric pressure.

Sulfur trioxide is a preferred sulfonating agent because it reacts in substantially stoichiometric quantities and its reactions do not involve by-products; for example, chlorosulfonic acid reactions produce HCl and sulfuric acid and fuming sulfuric acid produce $H_2O$.

While sulfur trioxide is an effective sulfonation agent, it is so powerful and its reactions are so exothermic that charring of the reaction mixture often results, accompanied by contamination and discoloration of the product. The use of vaporous sulfur trioxide diluted with an inert gas is widely recognized as an effective sulfonating agent for sulfonation of liquid organic compounds, whereby the diluent reduces the effective concentration of the sulfur trioxide, thereby reducing charring. The use of such gaseous diluents, however (particularly in higher proportions), requires relatively elaborate equipment for air supply, air purification, air flow control, and spent air discharge.

It is an object of this invention to provide a process for the reaction of sulfur trioxide vapor with liquid sulfonatable organic compounds whereby charring is eliminated or significantly reduced and which is economical and readily practiced.

It is a further object of this invention to provide a process for the reaction of liquid organic compounds with sulfur trioxide vapor which eliminates or reduces the equipment and effort required to supply the inert gaseous diluent.

These objects are achieved by the present invention which is directed to a process for the reaction of sulfur trioxide and sulfonatable organic compounds which comprises the introduction of sulfur trioxide vapor, either in undiluted form or diluted with an inert gas, with agitation, into a liquid sulfonatable organic compound contained in a reaction vessel maintained under subatmospheric pressure.

The process of this invention is illustrated in the accompanying drawings.

In FIGURE 1, A is the reaction vessel; B is an inlet into the vessel through which the charge of liquid organic compound is introduced; C is a tubular inlet into the vessel through which the sulfur trioxide vapor, together with any inert gaseous diluent used, is introduced into the vessel well beneath the surface of the liquid organic compound (preferably the lower end of the tube is a perforated distributor); D is a heat exchanger through which the liquid organic compound being sulfonated is circulated and recirculated to remove the heat of reaction. Since the sulfonation reaction is exothermic, the temperature should be controlled in order to avoid charring or other degradation of the reaction mixture. E is a mechanical agitator to provide the required agitation of the process. F is an opening at the top of the reaction vessel which is connected to a means (e.g., vacuum, pump or steam ejector) for maintaining the charge and the reaction vessel under subatmospheric pressure. G is the discharge at the bottom of the reaction vessel through which the sulfonated product is withdrawn at the completion of the process. The process of the instant invention is most readily carried out as a batch process, although it can be adapted to a continuous process. As used herein for convenience, the term sulfonating is intended to encompass both the true sulfonation reactions as well as sulfation.

FIGURE 2 with similarly lettered elements shows another method for introducing the sulfur trioxide vapor or the sulfur trioxide vapor and gaseous inert diluent mixture into the liquid organic compound to be sulfonated. In this variation, the sulfonating agent is introduced through inlet H into the agitator E; the sulfonating agent travels down through the hollow agitator shaft, through and out passageways within the agitator blades into the liquid organic compound to be dispersed at the edge of the agitation zone. FIGURE 2 also shows the use of a cooling coil J to maintain the desired temperature of the reaction.

FIGURE 3 with similarly lettered elements shows the introduction of the sulfur trioxide sulfonating agent through a series of jets K attached to a sulfur trioxide manifold L. The jet introduction provides high shear agitation that can be used to supplement or replace the mechanical agitation provided by the agitator E. The use of jets is most practical when an inert diluent gas mixed with the sulfur trioxide is used in the process. Preferably the inert gas-sulfur trioxide mixture is injected at high velocity, e.g., 500–1500 feet per second.

In sulfonating a liquid sulfonatable organic compound with vaporous sulfur trioxide, the reaction is essentially instantaneous since vaporous sulfur trioxide is a very powerful sulfonating agent. The controlling factor in reaction is, therefore, the rate of dispersion of the vaporous sulfur trioxide in the liquid organic compound since rapid dispersion enables rapid consumption of $SO_3$ vapor in desired sulfonation rather than in the production of undesirable by-products resulting from localized over-concentration of $SO_3$ vapor.

The partial pressure of the sulfur trioxide vapor is a prime factor in controlling the distribution and dispersion of sulfur trioxide in the liquid organic compound being sulfonated. The partial pressure of the sulfur trioxide ($P_p$) used in the sulfonation reaction is equal to the total pressure ($P_t$) of the system times the molar ratio of sulfur trioxide to sulfur trioxide plus inert gas.

$$P_p = P_t \times \frac{\text{moles } SO_3}{\text{moles inert gas} + \text{moles } SO_3}$$

As can be seen from this equation, reduction in the total pressure of the reaction vessel will permit a reduction or elimination in the molar quantity of diluent gas while maintaining the same partial pressure of sulfur trioxide which is necessary to achieve the desired reaction.

In the process of this invention, the sulfur trioxide is preferably used in stoichiometric amounts relative to the organic material to be sulfonated although up to about 3 to 10% or more excess of this amount can advantageously be used. Temperature of the sulfonation reaction with the preferred sulfonatable organic compounds hereinafter described is preferably maintained in the range of about 75° F. to about 150° F., the maximum temperature being set in the order to avoid charring or other degradation resulting from the high temperatures of the exothermic reaction. An especially preferred temperature range is 110° F. to 140° F.

When an inert gaseous diluent is used with the sulfur trioxide, the volume ratio of inert gas to sulfur trioxide is preferably in the range of about 0.75:1 to about 10:1. (In the latter half of the reaction cycle the ratio can often advantageously be increased to about 15:1 to 20:1.) As pointed out above, the use of a gaseous inert diluent requires supply, purification, flow control, mixing and discharge equipment but in the process of the instant invention this requirement is substantially reduced. Undiluted sulfur trioxide can also be used advantageously in the instant invention, thereby completely eliminating the need for the gaseous diluent supply equipment.

The reaction of the present invention is conducted in a reaction vessel under a subatmospheric pressure equivalent to about 1 to about 500 mm. of mercury. When the $SO_3$ is used in the undiluted form, the preferred pressure range is equivalent to about 1 to about 100 mm. of mercury. When a gaseous inert diluent is with the sulfur trioxide, the pressure is preferably that equivalent to about 200 to about 400 mm. of mercury.

The use of undiluted sulfur trioxide has the advantage of completely eliminating the need for the equipment needed for the inert gaseous diluent. There may, however, be some sacrifice in product color when no inert gaseous diluent is utilized at moderate subatmospheric pressures. Sulfonated products having preferred color characteristics are obtained when an inert gaseous diluent is utilized or when the subatmospheric pressures are very low. When an inert gaseous diluent is used, the diluent requirements are substantially less strict than those required by the conventional prior art sulfonation process empolying sulfur trioxide vapor diluted with substantial amounts of an inert gas at atmospheric pressures or above. Equipment for effecting subatmospheric pressures in the reaction vessel is much simpler to assemble and operate than equipment for compressing, mixing and purifying large amounts of gaseous diluent.

The maintenance of subatmospheric pressure in the reaction vessel can be effected by any of the well known means for doing so. For example, the subatmospheric pressure can be maintained by a steam-jet vacuum system or vacuum pump. When the sulfur trioxide is diluted with an inert gas the inert gas is discharged into the vacuum system after passing through the charge of liquid sulfonatable organic material. When undiluted sulfur trioxide is used the vacuum draws off gaseous impurities or by-products, if any, such as sulfur dioxide. When using undiluted sulfur trioxide, the reaction vessel containing the liquid sulfonatable organic material can initially be evacuated to establish a subatmospheric pressure and sealed; then, as the undiluted sulfur trioxide vapor is added to the agitated organic material, the reaction takes place to form liquid sulfonic acid, and the subatmospheric pressure is maintained since little or no gas reaches the head space to increase the pressure.

The sulfonatable organic material is usually charged into the reaction vessel at room temperature if the material is liquid at that temperature. If the material is normally solid it is first melted by a preheater arrangement and fed into the vessel at an elevated temperature; the temperature is thereafter controlled to maintain the charge in liquid condition throughout the reaction.

The reactions of this invention ordinarily involve a reaction cycle of from about 30 to about 180 minutes depending on the rate of dispersion, efficiency of reaction cooling and the size of the charge. The reaction cycle is, however, not critical; for economy, however, the rate of sulfonation may be decreased near the end of the cycle, if desired. The time for the reaction is that needed to add to the liquid sulfonatable organic material at least a stoichiometric quantiy of sulfur trioxide for complete sulfonation of the material.

Any organic compound which is liquid under the temperature and pressure conditions of the reaction and which is sulfatable or sulfonatable can be used in the process of this invention. A compound having a boiling point at least about 40° F. above the reaction temperature (at the reactor pressure) is preferred to avoid a tendency for the sulfonable organic liquid to be vaporized and drawn off through any vacuum means used to maintain the subatmospheric pressure. If the sulfonatable compound tends to be partially vaporized and drawn off, however, it can readily be condensed and recharged to the reactor and still utilize the advantages of the invention. For example, if ethanol or benzene is sulfonated, the reaction is conducted at reduced temperatures to maintain the compound in a liquid condition. The reactions of this invention normally take place under anhydrous conditions.

Preferred sulfonatable organic compounds used in the process of this invention alkyl aryl hydrocarbons, higher fatty alcohols, condensation products of higher fatty alcohols and ethylene oxide, condensation products of alkyl phenols and ethylene oxide, and higher fatty acids.

Sulfonatable alkyl aromatic compounds include the mononuclear (e.g., benzene and toluene) or polynuclear (e.g., naphthalene and anthrocene) organic compounds. More particularly included as examples are the higher alkyl aryl hydrocarbons having an alkyl constituent containing 9 to 18 carbon atoms, for example those alkyl aryl hydrocarbons derived from benzene, toluene and naphthalene. The alkyl substituent can be straight or branched chain in structure and comprises such groups as decyl, dodecyl, pentadecyl, octadecyl, mixed long-chain alkyls derived from kerosene, fatty materials and polymer of lower olefins, cracked paraffin wax olefins, and the like. Preferred examples of this class are the higher alkyl benzenes wherein the alkyl group is about 12 to 15 carbon atoms, e.g., tetrapropylene or pentapropylene-benzene.

Also suitable are condensation products of alkyl phenols with ethylene oxide, e.g., 1 to 10 moles. Preferred alkyl phenols are those wherein the alkyl ranges from about 8 to about 18 carbon atoms, e.g., nonyl phenol and tridecyl phenol.

Sulfonatable higher fatty alcohols include straight and branched chain, fatty alcohols including those from the natural sources, e.g., coconut oil and tallow, and those from synthetic sources, e.g., "oxo" process. These alcohols preferably range from 10 to 18 carbon atoms. Specific examples are dodecanol, hexadecanol, octadecanol, tridecanol and the like. Preferred alcohols are those derived from coconut oil. Also suitable are the ethylene oxide condensates of such fatty alcohols, e.g., condensates resulting from reaction with 1 to 10 moles of ethylene oxide.

Sulfonatable higher fatty acids are examplified by those ranging from about 10 to about 20 carbon atoms in chain length which are preferably from natural sources. Specific examples are the individual acids, e.g., lauric, palmitic and stearic acids and the mixtures of acids derived from coconut oil and tallow.

The sulfates or sulfonates of the above organic materials as formed by the process of this invention, particularly in their neutralized form, are outstandingly useful as detergents, emulsifiers and surface active agents, particularly in the washing of textiles and other fabrics.

Examples of sulfonatable lower alkyl aryl hydrocarbons are toluene and xylene. The sulfonates of xylene and toluene are useful as hydrotroping agents.

The sulfonated products resulting from the process of this invention are most useful if they are neutralized after the reaction by well known means with any of the usual reagents, e.g., sodium, potassium or ammonium hydroxide, sodium or potassium carbonate, triethanolamine and the like.

The sulfur trioxide vapor used to carry out this process can be obtained from several sources. For example, it can be obtained by vaporizing liquid sulfur trioxide, from oleum, from converter gas (which contains about 10% $SO_3$) or from other sources. A conventional form of liquid sulfur trioxide, which can be vaporized, is the gamma form which contains a large proportion of monomeric sulfur trioxide and melts at about 17° C. This material is commercially available in a stabilized liquid form.

Suitable inert diluent gases are of the conventional type, e.g., air, nitrogen, carbon dioxide, sulfur dioxide and the like.

The following examples are given to additionally illustrate the nature of the invention and it will be understood that the invention is not limited thereto. All parts and percentages are by weight unless otherwise specified.

Example I 100 pounds of alkyl benzene having an average molecular weight of 246, the alkyl having been derived from a mixture of tri, tetra and pentapropylene and averaging 12 carbon atoms, were charged into the closed reaction vessel shown in FIGURE 1. The size of the vessel was such that the head space above the alkyl benzene charge equalled about 100% of the total volume of the charge. Undiluted sulfur trioxide vapor was introduced into the liquid alkyl benzene by means of a distributor having ten ¼" holes at the rate of 47 pounds per hour. The reaction mixture was vigorously agitated. The reaction vessel was maintained under a subatmospheric pressure equivalent to 10 mm. of mercury using a steam-jet vacuum system. The temperature of the reaction was maintained at 140° F. using a recirculating heat exchanger system connected to and located outside the reaction vessel. The sulfur trioxide vapor was added for 42 minutes until a total of 33 pounds (a molar equivalent amount plus 3% excess) had reacted with the alkyl benzene to form alkyl benzene sulfonic acid. The sulfonation was 97% complete. After the sulfur trioxide addition was stopped, the vacuum was broken; the sulfonic acid reaction mixture (which showed no evidence of charring) was then discharged from the reaction vessel and neutralized with a stoichiometric amount of sodium hydroxide to form a highly effective detergent material especially useful in a liquid detergent formulation.

Comparable results are obtained if an equivalent amount of the condensation product of nonylphenol and four moles of ethylene oxide is sulfonated according to the process of Example I, but using the sulfur trioxide introduction means of FIGURE 2.

Example II 100 pounds of the condensation product of coconut fatty alcohol and 3 moles of ethylene oxide (a liquid) were charged into the closed reaction vessel shown in FIGURE 3. The size of the vessel was such that the head space above the alcohol-ethylene oxide condensate charge equaled about 150% of the total volume of the charge. At the bottom of the reaction vessel were 2 jets (placed on a circular manifold) each jet having a ⅛" inside diameter. At the beginning of the reaction, a mixture of air and sulfur trioxide vapor in the ratio of air to $SO_3$ by volume of 6.5:1 was introduced into the vessel through the jets at sonic velocity, i.e., at 1200 feet per second. At each jet a cone of the air-diluted sulfur trioxide was formed providing a high shear interface thereby resulting in rapid and complete sulfonation, without charring, of the fatty alcohol-ethylene oxide condensate. The sulfur trioxide in the cone was substantially dispersed in the organic liquid before leaving the cone area thereby aiding in the efficiency of the operation. This air-sulfur trioxide mixture of the 6.5:1 ratio was injected for 20 minutes after which the ratio of air to sulfur trioxide in the mixture was increased to 7:1 for 13 minutes, then to 14:1 for 13 minutes, then to 20:1 for the remaining 14 minutes of the 60 minute reaction cycle. The reaction was then stopped. The total quantity of sulfur trioxide injected was that stoichiometrically required for complete sulfonation of the charge. Throughout the reaction, the liquid reaction mixture was mechanically agitated and the entire reaction vessel was maintained under a pressure of one-half atmosphere; i.e., equivalent to 380 mm. of mercury. This vacuum was maintained with a manually controlled steam ejector system. In addition, throughout the reaction, the temperature of the liquid mass being sulfonated was maintained at 120° F. using a recirculating heat exchanger system connected to and located outside the reaction vessel. The sulfonation was 97% complete. The vacuum was broken.

At the completion of the reaction, sulfonated alcohol-ethylene oxide condensate (substantially water-white) was discharged from the reaction vessel and neutralized with a stoichiometric amount of ammonia to form a highly effective detergent surface active material of good color characteristics. This material is especially useful in a liquid dishwashing detergent composition.

Comparable results are obtained if equivalent amounts of coconut fatty alcohol or a mixture of equal parts of coconut fatty alcohol and the alcohol-ethylene oxide condensate are used in the process of Example II. Comparable results are also obtained if an equivalent amount of substantially completely hydrogenated tallow fatty acid is sulfonated according to the process of Example II to form a product useful in detergent bars.

While there has been disclosed and described what at present is considered to be the preferred embodiment of the invention, it will be understood that many changes, modifications and substitutions can be made therein without departing from the scope of the invention as defined in the appended claims.

What is claimed is:

1. A process for sulfonating sulfonatable organic compounds selected from the group consisting of fatty alcohols containing from 8 to 18 carbon atoms, condensation products of said alcohols with ethylene oxide, alkyl benzene, alkyl toluene and condensation products of alkyl phenols with ethylene oxide, the said alkyls containing from 8 to 18 carbon atoms, and fatty acids ranging in chain length from 10 to 20 carbon atoms, consisting essentially of the step of reacting undiluted sulfur trioxide vapor with a liquid charge of said organic compound with agitation in a reaction vessel maintained at a subatmospheric pressure equivalent to about 1 mm. to about 500 mm. of mercury at a temperature in the range of about 75° F. to about 150° F., said sulfur trioxide vapor being introduced into the reaction mixture well beneath the surface of the liquid organic compound, said organic compound having a boiling point at least about 40° F. above the reaction temperature at the reaction vessel pressure.

2. The process of claim 1 wherein the reaction temperature ranges from 110° F. to 140° F.

3. The process of claim 2 wherein the subatmospheric pressure is that equivalent to about 1 mm. to about 100 mm. of mercury.

4. The process of claim 3 wherein the sulfonatable organic compound is dodecyl benzene.

5. The process of claim 3 wherein the sulfonatable organic compound is a condensation product of coconut fatty alcohol and ethylene oxide.

6. The process of claim 3 wherein the sulfur trioxide is dispersed at the edge of the agitation zone.

References Cited by the Examiner

UNITED STATES PATENTS

| | | | |
|---|---|---|---|
| 2,691,040 | 10/1954 | Block et al. | 260—458 XR |
| 2,693,479 | 11/1954 | Ross | 260—457 XR |
| 2,771,484 | 11/1956 | Blaser et al. | 260—458 |
| 2,828,331 | 3/1958 | Marisic et al. | 260—686 XR |
| 2,843,626 | 7/1958 | Gebelein et al. | 260—505 |
| 2,865,958 | 12/1958 | Davies et al. | 260—686 XR |
| 2,923,728 | 2/1960 | Falk et al. | 260—458 XR |
| 2,945,842 | 7/1960 | Eichhorn | 260—686 XR |
| 3,054,820 | 9/1962 | De Jong et al. | 260—458 |

FOREIGN PATENTS

| | | |
|---|---|---|
| 804,346 | 11/1958 | Great Britain. |
| 837,585 | 6/1960 | Great Britain. |

CHARLES B. PARKER, *Primary Examiner.*